Oct. 10, 1967  E. J. HAYES  3,346,076
DISC BRAKE WITH REINFORCED SHOE
Filed Feb. 28, 1966  4 Sheets-Sheet 1
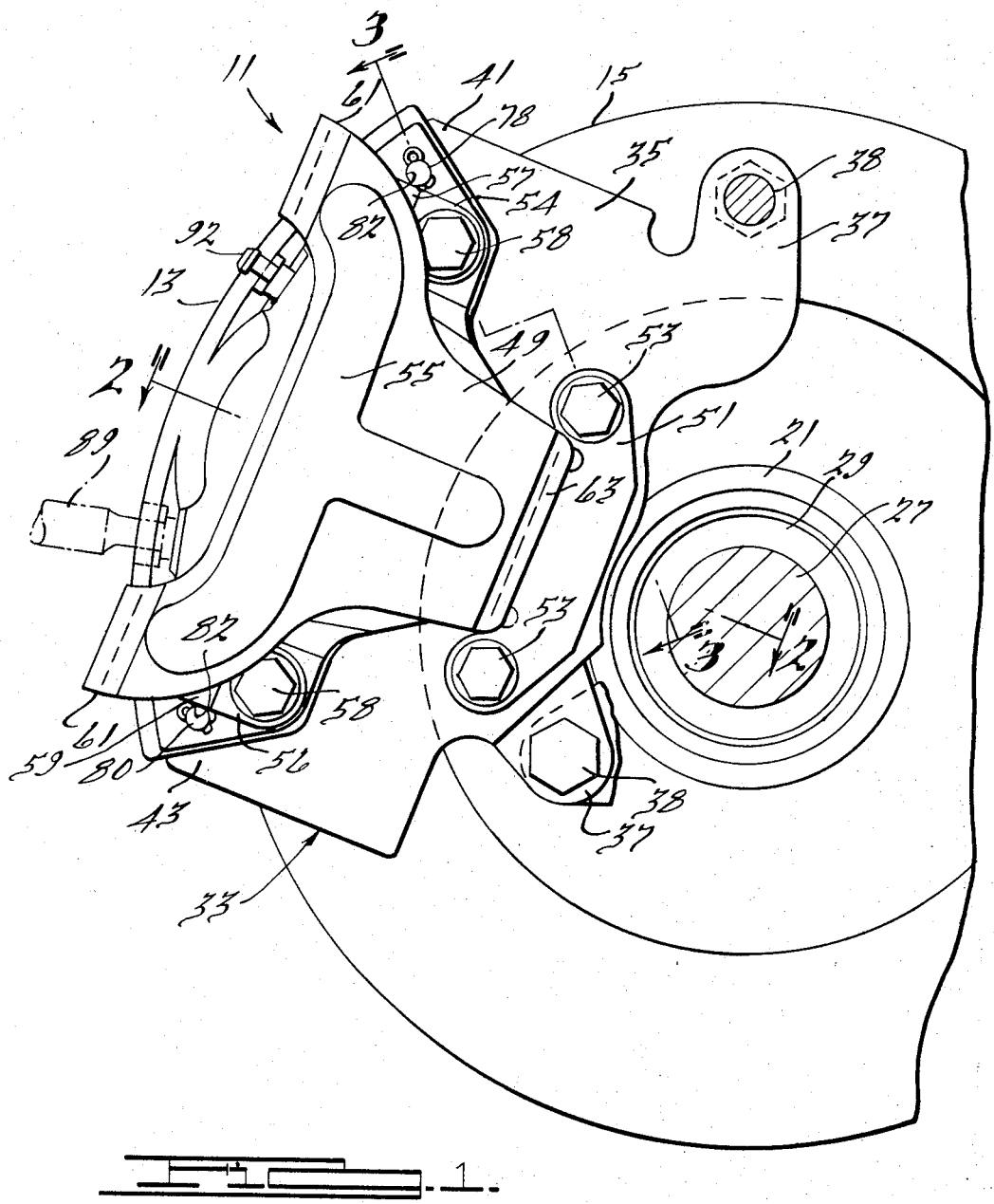
INVENTOR.
Edward J. Hayes.
BY
ATTORNEYS.

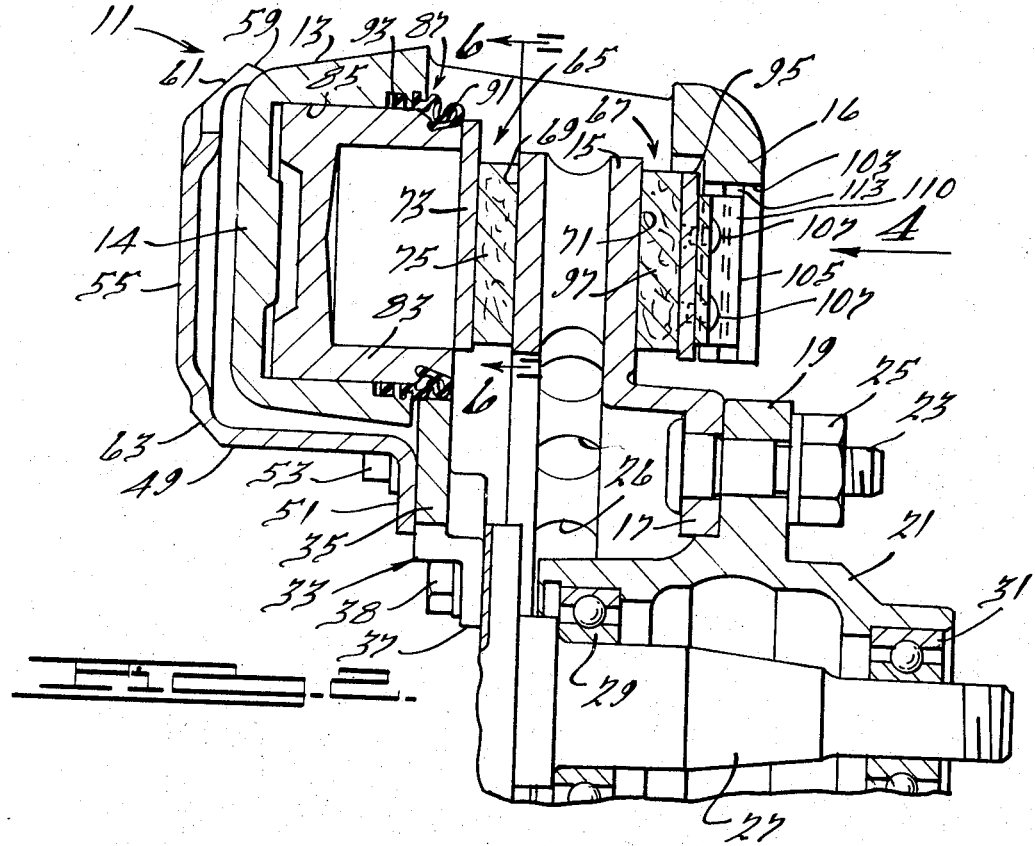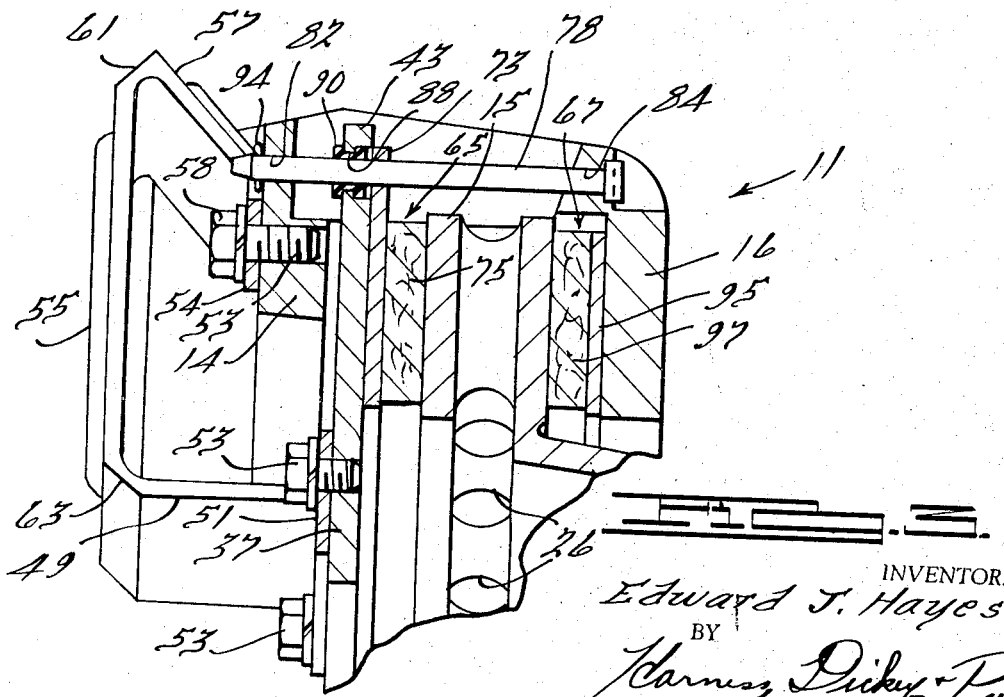

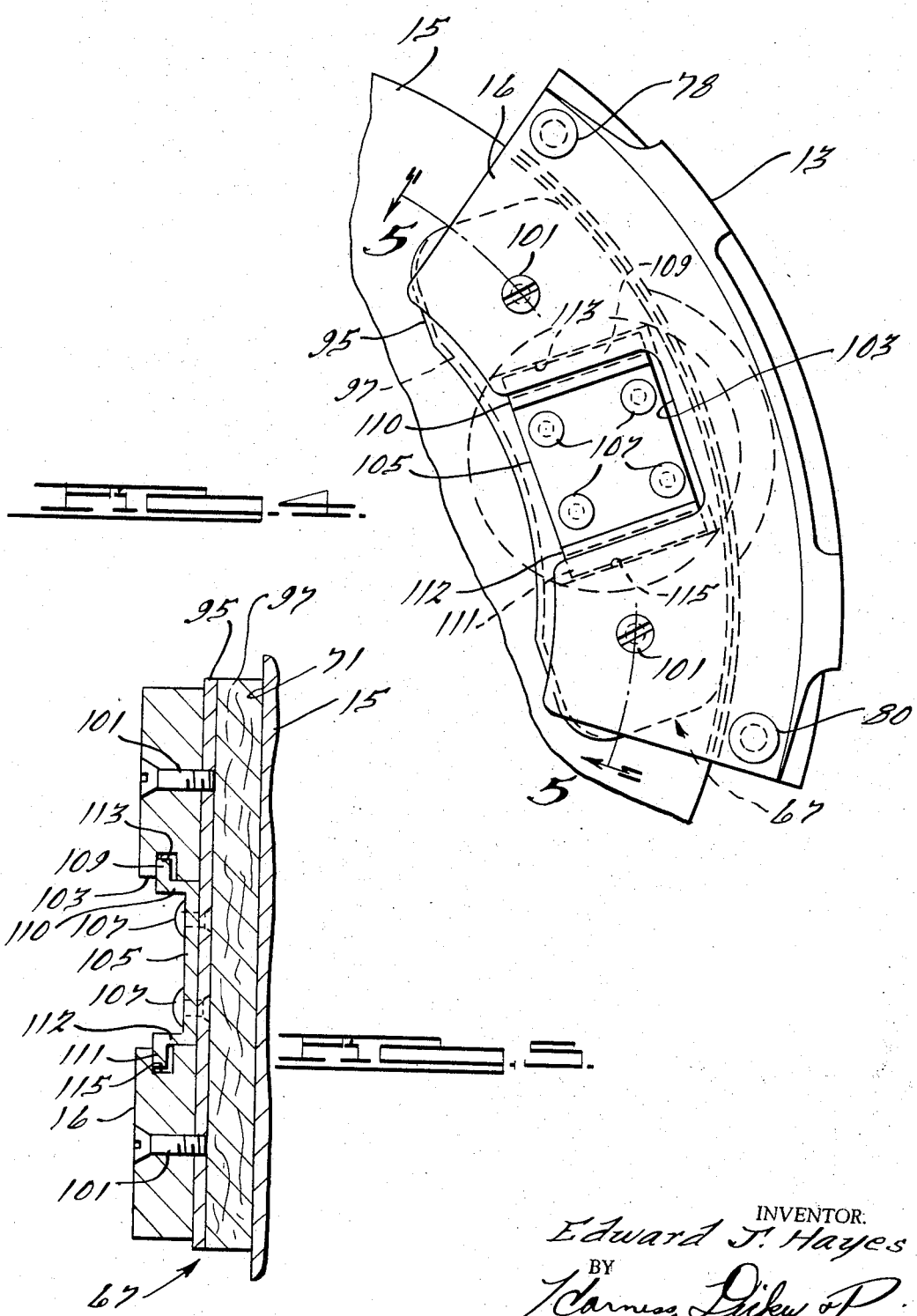

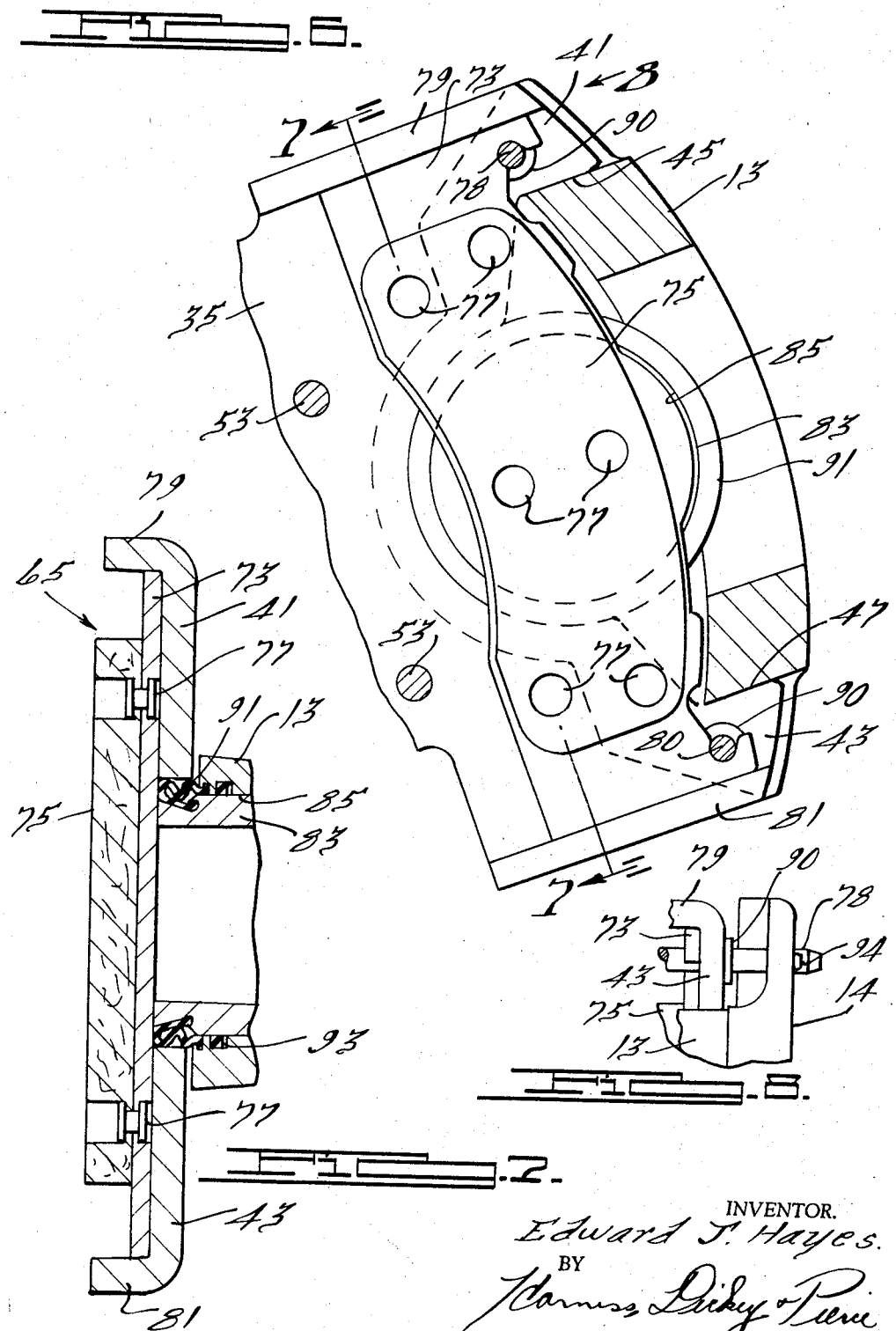

United States Patent Office 3,346,076
Patented Oct. 10, 1967

3,346,076
DISC BRAKE WITH REINFORCED SHOE
Edward J. Hayes, Livonia, Mich., assignor to Kelsey-Hayes Company, Romulus, Mich., a corporation of Delaware
Filed Feb. 28, 1966, Ser. No. 530,498
3 Claims. (Cl. 188—73)

ABSTRACT OF THE DISCLOSURE

A sliding caliper type disc brake assembly for motor vehicles. One side of the caliper slidably supports a hydraulically actuated piston that moves an associated brake shoe into engagement with a rotating disc supported in part by the caliper. The caliper has a leg which extends on the opposite side of the disc and which is made up of spaced portions that define a gap. A second brake shoe is associated with this portion of the caliper with a reinforcing plate extending across the opening for transmitting forces from the caliper to the backing plate of the second shoe in a uniform manner.

---

This invention relates generally to brakes, and particularly to an improved disc brake having a reinforced brake shoe.

The brakes to which the present invention relates are of the type having opposed brake shoes movable into frictional engagement with opposite faces of a rotor or disc secured for rotation with a wheel. A non-rotating housing or caliper has generally opposed legs disposed in spaced confronting relation to an arcuate segment of the rotor and has a cylinder bore formed on the interior of one of these legs. A piston is slidably disposed in the bore and is adapted when moved in one direction to press a brake shoe into frictional engagement with one face of the rotor. The reaction force to piston movement moves the caliper in the opposite direction causing a brake shoe backed and carried by the other caliper leg to frictionally engage the other rotor face.

From a cost standpoint, the caliper desirably is of unitary cast construction. However, cast metal is relatively heavy and from the standpoint of the weight of the overall brake assembly, it is desirable that the caliper be reduced in size and/or portions thereof eliminated wherever possible without detracting from its strength or proper operating capabilities.

Along this line, one of the critical portions of the caliper is the leg which carries the one brake shoe. Thus, in order to achieve proper braking, the pressure between this shoe and the rotor during braking should be relatively constant along the entire shoe surface. If a portion of this caliper leg were removed without any provision for brake shoe reinforcement, this would cause uneven pressure between the shoe and the rotor resulting in undesirable uneven braking effect and brake lining wear. Of course, the brake shoe backing plate could be made heavier and more rigid but this would defeat the weight saving purpose. Thus, a low-cost, light-weight brake shoe and caliper capable of providing consistent pressure contact between the shoe and a rotor would be highly advantageous.

An important object of the present invention is to provide a disc brake utilizing a relatively light-weight caliper together with a novel reinforced brake shoe.

Further objects include the provision of a disc brake of the above character which is relatively inexpensive to manufacture, rugged in construction and reliable and consistent in result.

Further objects and advantages of the present invention will become more apparent from a consideration of the following detailed description taken in conjunction with the drawings in which:

FIGURE 1 is a fragmentary elevational view illustrating a disc brake embodying the present invention;

FIG. 2 is a sectional view of FIG. 1 taken along the line 2—2 thereof;

FIG. 3 is a sectional view of FIG. 1 taken along the line 3—3 thereof;

FIG. 4 is a fragmentary elevational view of FIG. 2 looking in the direction of the arrow 4;

FIG. 5 is a sectional view of FIG. 4 taken along the line 5—5 thereof;

FIG. 6 is an enlarged sectional view of FIG. 2 taken along the line 6—6 thereof;

FIG. 7 is an enlarged sectional view of FIG. 6 taken along the line 7—7 thereof; and FIG. 8 is a fragmentary view of FIG. 7 looking in the direction of the arrow 8.

Broadly described, the present invention includes a housing having at least one leg in spaced confronting relation to an arcuate portion of a rotor secured for rotation with a wheel, fluid motor means associated with said housing and adapted to press a first brake shoe into frictional engagement with one face of said rotor, a second brake shoe carried by said housing leg and adapted to engage the other face of said rotor, said leg having laterally spaced portions defining an intermediate opening, opposed slots in said laterally spaced leg portions, said second brake shoe having a reinforcing plate secured in backing relation thereto and positioned in said opening, said plate having its ends positioned in said slots.

Referring now more specifically to the drawings, a disc brake embodying the present invention is shown generally at 11 in FIGS. 1–3 and is seen to include a housing or caliper 13 having opposed legs 14, 16 disposed in spaced confronting relation to an arcuate segment of a rotor or disc 15. The rotor 15 has a laterally offset flange 17 fixed to a flange 19 of a hub 21 by bolts 23 and nuts 25 and is provided with radially extending apertures 26 through which cooling air moves during disc rotation. The hub 21 is rotatably supported on a fixed wheel spindle 27 by bearings 29, 31 and is adapted for connection to a conventional vehicle wheel (not shown) in the usual manner for conjoint rotation.

A torque spider 33 comprises a web 35 having laterally offset projections 37 adapted to be fixed by screws 38 to a conventional steering knuckle assembly (not shown) supported by the spindle 27 through a king pin arrangement (not shown) when the disc brake 11 is used on a vehicle front wheel. In the rear wheel version, the spider 33 can be secured directly to the fixed spindle 27. A pair of torque arms 41, 43 extend outwardly from the web 35 and have opposed torque reaction faces 45, 47 engaging the caliper 13 (FIG. 6). A flexible strap 49 has an inner flange 51 fixed to the torque spider 33 by screws 53 and an outer, laterally offset leg 55 overlying one caliper leg 14. A pair of spring fingers 57, 59 extend inwardly from the upper end of the strap leg 55 forming an acute angle therewith and have terminal portions 54, 56 fixed to the caliper 13 by screws 58. The strap leg 55 has reduced thickness areas 61, 63 which form fulcrum points about which the strap fingers 57, 59 and leg 55 bend or flex to accommodate movement of the caliper 13 in a direction transverse to the rotor 15 as will be described.

A pair of brake shoes 65, 67 are disposed in overlying relation to opposite radial faces 69, 71, respectively, of the rotor 15 (FIGS. 2 and 3). The brake shoe 65 includes a backing plate 73 having brake lining 75 fixed thereto by bonding or by rivets 77 (FIGS. 6 and 7). The backing plate 73 is slidably positioned between a pair of right angle flanges 79, 81 integral with the torque arms 41, 43, respectively. A pair of pins 78, 80 extends through openings 82, 84 in the caliper legs 14, 16 and through openings 88 in the torque arms 41, 43 to position the brake shoe 65 during assembly and disassembly. A pair of rubber grommets 90 in snug frictional engagement with the pins 78, 80 are retained in the arm openings 88. Cotter pins 94 removably hold the pins 78, 80 against movement relative to the caliper 13.

The backing plate 73 is positioned for engagement by a piston 83 slidably disposed within a cylinder bore 85 formed in the leg 14 of the caliper 13. The cylinder bore 85 and piston 83 together form a hydraulic motor 87 to which pressurized fluid is delivered by a conduit 89 from a conventional master cylinder (not shown). The master cylinder (not shown) is actuated by means such as a conventional vehicle brake pedal when it is desired to slow or stop the vehicle as is customary. A flexible boot 91 has its ends fixed to the caliper 13 and the piston 83, respectively, to prevent contamination of the sliding piston 83 and cylinder 85 surfaces. A fitting 92 is provided on the caliper 13 and communicates with the cylinder bore 85 for purposes of bleeding the hydraulic system.

When fluid pressure is delivered to the cylinder bore 85 from the master cylinder (not shown), the piston 83 is moved toward the right, as seen in FIG. 2, and presses the lining 75 of the brake shoe 65 into frictional engagement with the face 69 of the rotor 15. This causes an annular, generally rectangular cross-sectional seal 93, carried in the cylinder bore 85 and engaging the piston 83 to twist or become distorted. Thus, when the fluid pressure is released, the seal 93 returns the piston 83 toward the left, as seen in the figure, and releases the brake shoe 65 from the rotor 15.

The brake shoe 67 comprises a backing plate 95 having brake lining 97 bonded or riveted thereto in the usual manner. The backing plate 95 is secured to the other leg 16 of the caliper 13 for conjoint movement therewith by screws 101 extending inwardly from the axle outboard side. When fluid pressure is admitted to the cylinder bore 85 of the motor 87 to press the lining 75 of the brake shoe 65 into frictional engagement with the face 69 of rotor 15 as described above, the reaction to this pressure biases the caliper 13 toward the left as seen in FIG. 2. The strap fingers 57, 59 and leg 55 are flexed so as to act like a spring to bias the caliper 13 toward the left as seen in FIG. 2 and normally hold the brake lining 97 in light contact with the rotor face 71. When the motor 87 is pressurized, the biasing force on the caliper 13 causes the lining 97 of the brake shoe 67 to be pressed into tight frictional engagement with the face 71 of the rotor 15 and the vehicle wheel (not shown) associated therewith is slowed or stopped. During this caliper movement, the strap fingers 57, 59 and leg 55 flex slightly about the fulcrum areas 61, 63 and insure that the caliper 13 moves along a straight line normal to the rotor faces 69, 71. When the pressure in the cylinder bore 85 is released, the caliper 13 is held with the lining 97 in light engagement with the rotor face 71 under the force of the strap 49. A description of the strap 49 and its operation is set out in greater detail in the copending application, Ser. No. 541,732 filed Apr. 11, 1966, and owned by the assignee of the present application.

The grommets 90 and the pins 78, 80 prevent excessive rubbing contact between the brake shoes 65, 67 and the rotor 15 such as is caused by centrifugal force on the parts when the wheels are turned during vehicle cornering. This centrifugal force tends to move the caliper 13 relative to the rotor 15 in a direction opposite to the direction the wheels are turned. The grommets 90 frictionally hold the pins 78, 80 against movement axially relative to the torque arms 41, 43 and the pins 78, 80 cannot move with respect to the caliper 13. The caliper 13 can move transversely to the rotor 15 only if the grommets 90 become distorted or stretched. However, these grommets 90 have sufficient stiffness to resist this centrifugal force on the caliper 13.

When the linings 75, 97 of brake shoes 65, 67 engage the rotor faces 69, 71 during wheel rotation, the friction exerts a torque on the caliper 13 which is reacted at the torque arms 41, 43 to prevent the caliper from turning. When the fluid pressure is released, the piston 83 returns toward the left under the force of the distorted seal 93, and the caliper 13 moves only slightly toward the right as seen in FIG. 2 since it is held by the strap 49 with the brake lining 97 in light contact with the rotor face 71. Braking pressure on the brake shoes 65, 67, however, is released.

According to the present invention, the caliper leg 16 has a relatively large, intermediate opening 103 therein. A brake shoe reinforcing plate 105 is positioned in the opening 103 and is fixed to the backing plate 95 by rivets 107. The reinforcing plate 105 has a pair of offset flanges 109, 111 connected thereto by right-angle arms 110, 112, respectively. The flanges 109, 111 extend into the opening 103 and are positioned within opposed slots 113, 115 in the caliper leg 16. As seen in FIG. 5, the flanges 109, 111 seat against the sides of the slots 113, 115 remote from the brake shoe 67 and the arms 110, 112 are compression loaded when the backing plate 95 is seated against the caliper leg 16. This arrangement greatly increases the supporting strength afforded by the reinforcing plate 105 for the brake shoe 67 in the area of the opening 103 and provides the stiffness needed. The relative small size and thickness of the reinforcing plate 105 as compared to the eliminated portion of the caliper leg 16 at the opening 103 greatly reduces the weight of the overall brake assembly without sacrificing any strength or rigidity of the parts and is therefore highly advantageous.

To assemble the brake shoe 67 to the caliper 13, the shoe and the attached reinforcing plate 105 are positioned within the caliper leg 16 by the sliding reinforcing plate flanges 109, 111 upwardly along the slots 113, 115. Thereafter, the screws 101 are fastened to the backing plate 95 to seat it tightly against the caliper leg 99 and seat the flanges 109, 111 tightly against the outer surfaces of the slots 113, 115 as shown. Removal of the brake shoe 67 is effected in opposite fashion and is done completely on the outboard side of the axle 27.

By the foregoing, there has been disclosed an improved disc brake having a reinforced brake shoe and while a preferred embodiment of the invention has been illustrated and described above in detail, various additions, substitutions, modifications and omissions may be made thereto without departing from the spirit of the invention as encompassed by the appended claims.

What is claimed is:

1. A disc brake assembly comprising a caliper housing having at least one leg positioned in spaced confronting relationship to an arcuate portion of a rotor secured for rotation with a wheel, fluid motor means associated with said caliper, a first brake shoe associated with said fluid motor means, a second brake shoe associated with said one leg, said fluid motor means being adapted to move said first brake shoe into frictional engagement with one face of the rotor and to move said caliper housing to bring said second brake shoe into frictional engagement with the opposite face of the rotor, said leg having laterally spaced portions defining an intermediate opening, said second brake shoe having a backing plate operatively engaged by said spaced portions and extending at least in part across said intermediate opening, and reinforcing means for said second brake shoe secured to the portion of said backing plate contiguous to said opening and associated with said leg for transmitting forces from said leg to said backing plate.

2. A disk brake assembly as set forth in claim 1 wherein the reinforcing means has outstanding flange means at its opposite sides and adjacent the spaced portions of the leg, said flange means being abuttingly engaged by said leg portions for transmitting forces from said leg portions to said flange means.

3. A disk brake assembly as set forth in claim 2 wherein the flange means are received in slots formed in the leg portions.

References Cited

UNITED STATES PATENTS

| 2,655,229 | 10/1953 | Eksergian | 188—73 X |
| 3,042,152 | 7/1962 | Butler | 188—152 |
| 3,047,098 | 7/1962 | Olley | 188—73 |

MILTON BUCHLER, *Primary Examiner.*

G. E. HALVOSA, *Assistant Examiner.*